United States Patent [19]

Fujiwara et al.

[11] Patent Number: 4,996,664
[45] Date of Patent: Feb. 26, 1991

[54] FILE SYSTEM

[75] Inventors: Takutoshi Fujiwara, Tokyo; Motofumi Konishi, Yokohama, both of Japan

[73] Assignee: Canon Kabushiki Kaisha, Tokyo, Japan

[21] Appl. No.: 240,466

[22] Filed: Sep. 6, 1988

Related U.S. Application Data

[63] Continuation of Ser. No. 734,276, May 3, 1985, abandoned.

[30] Foreign Application Priority Data

Sep. 22, 1983 [JP] Japan .................................. 58-174120

[51] Int. Cl.⁵ .............................................. G06F 15/40
[52] U.S. Cl. ........................................................ 364/900
[58] Field of Search ... 364/200 MS File, 900 Ms File; 235/454; 358/256

[56] References Cited

U.S. PATENT DOCUMENTS

| | | | |
|---|---|---|---|
| 3,865,478 | 2/1975 | Ooue et al. | 353/26 R |
| 4,081,604 | 3/1978 | Kanaiwa | 178/30 |
| 4,139,901 | 2/1979 | Ganske et al. | 364/900 |
| 4,205,780 | 6/1980 | Burns et al. | 235/454 |
| 4,264,808 | 4/1981 | Owens et al. | 364/406 |
| 4,270,182 | 5/1981 | Asija | 364/900 |
| 4,400,777 | 8/1983 | Mori | 364/200 |
| 4,491,874 | 1/1985 | Yamamoto | 364/518 |
| 4,509,139 | 4/1985 | Greager, Sr. | 364/900 |
| 4,513,390 | 4/1985 | Walter et al. | 364/900 |
| 4,544,956 | 10/1985 | Shimizu | 364/518 |
| 4,601,003 | 7/1986 | Yoneyama et al. | 364/900 |
| 4,658,299 | 4/1987 | Tanaka et al. | 358/256 |
| 4,760,458 | 7/1988 | Watanabe et al. | 358/256 |
| 4,760,526 | 7/1988 | Takeda et al. | 364/300 |

FOREIGN PATENT DOCUMENTS

| | | |
|---|---|---|
| 56-22172 | of 0000 | Japan . |
| 49-36242 | of 0000 | Japan . |
| 49-52949 | of 0000 | Japan . |
| 57-59279 | of 0000 | Japan . |
| 54-97723 | 7/1979 | Japan . |
| 55-134596 | 9/1980 | Japan . |

Primary Examiner—Gary V. Harkcom
Assistant Examiner—Christopher H. Lynt
Attorney, Agent, or Firm—Fitzpatrick, Cella, Harper & Scinto

[57] ABSTRACT

A file system is capable of retrieving image information stored in a microfilm file and image information stored in a disk through common input information.

17 Claims, 4 Drawing Sheets

FILE SYSTEM

This application is a continuation of application Ser. No. 734,276 filed May 3, 1985, now abandoned.

TECHNICAL FIELD

The present invention relates to an image file system, and more particularly to an image file system for storage and retrieval of a large amount of image information.

BACKGROUND ART

Conventionally microfilm systems have been employed for storage and administration of a very large amount of non-coded information (image information). Microfilm is featured by economy, archival storage ability, high resolving power and high input speed allowing a large amount of copying operations at a high speed, and is suitable for efficient storage and administration of filed information that increases year after year.

On the other hand, remarkable progress in office automation is stimulating introduction of computers into various office equipment and mutual connection of such equipment through communication networks. In order to adapt to such trend toward the use of computers and communication networks it is strongly desirable to store information to be processed in the form of electrical signals. For this reason much attention has been paid, in recent years, to electronic file systems, which, being designed to store information in the form of electrical signals, are provided with such advantages as high-speed retrieval or high-speed transmission that not present in microfilm systems.

Though the electronic file systems are sufficiently adaptable to the recent trend of office automation because of the above-mentioned advantages, the conventional microfilm systems have to be considered as lacking such adaptability, particularly compatibility with such computer- or communication-oriented office equipment.

In the following there will be given a more detailed explanation of the conventional microfilm system and the electronic file system while making reference to the attached drawings.

In the conventional microfilm system, hard copies are prepared in a reader-printer typically illustrated in FIG. 1, wherein a light beam from a light source 1 is transmitted by a microfilm 2 and a lens 3, and is reflected by a fixed mirror 4. In the use as reader, a movable mirror 5 is positioned at A, whereby the light reflected by the fixed mirror 4 is projected onto a screen 6, thus forming the image of the microfilm onto said screen 6. On the other hand, in the use as printer, the movable mirror 5 is moved to a position B, whereby the reflected light from the fixed mirror 4 is projected onto a photo-sensitive paper 7. The photosensitive paper thus exposed is developed in a developing station 8 and discharged as a hard copy.

Such process, however, is time-consuming and is associated with an inferior image quality. For improving image quality, therefore, it is also proposed to obtain hard copies by introducing the reflected light from the movable mirror 5 at the position B into an ordinary copier. Nevertheless the drawback of the amount of time required is not resolved at all, since, in either case, the procedure of retrieving a desired one from a large amount of microfilms and setting it on the reader-printer for obtaining hard copies remains unchanged. In addition, in case of sending the information contained in the microfilm to another location, it has been necessary, in the above-described process, to mail the hard copies obtained in the above-described procedure or to send them through a facsimile device, and such solution cannot be considered to match the recent trend of office automation.

In order to resolve such drawbacks there has been proposed a microfilm file as shown in FIG. 2, which shows a microfiche system as an example wherein microfiche films 10 are stored in a determined order in a magazine 9.

For projecting a microfilm frame bearing the record of a desired document in this file system, an address A is entered from an input unit such as an unrepresented keyboard. In response to the address A, a retrieval unit 11 rotates the magazine 9 and stops it at a designated position. Then an unrepresented drive unit extracts a microfiche film 10 from the magazine 9 and properly positions the desired frame. Upon completion of positioning, a light source 12 is turned on, and the emitted light beam is transmitted through a lens 13, the desired frame of the microfiche film 10 and a lens 14 and enters a half-mirror 15. After reflection by the half-mirror 15, the light beam is transmitted through a lens 16 and is projected on an unrepresented optical screen, thus forming thereon the image of the desired frame.

In the following there will be explained the procedure of preparing a hard copy from the information displayed on the screen, or sending it to another location through a facsimile device. The light beam transmitted by the half-mirror 15 is converted into electrical signals by a photoelectric sensor 17, and electrical signals are subjected to suitable processsing such as binary encoding and amplification in a signal processing unit 18 and are released as image data D. The photoelectric sensor 17 performs scanning in a direction indicated by an arrow by means of a scan control unit 19, thus converting the image information of the entire frame into electrical signals. The image data D thus obtained from the desired frame are supplied to an unrepresented hard copy unit or an unrepresented facsimile transmitting unit. The photoelectric sensor 17 can be conveniently composed of a CCD linear array sensor. Naturally the above-mentioned scanning drive is dispensed with when a two-dimensional area sensor is employed.

FIG. 3 shows an example of the microfilm file in which the microfilm is formed as a rolled film. The function in this case is almost same as in the microfilm file shown in FIG. 2, except that a microfilm 20 contained in a cartridge 21 requires a somewhat different driving process for retrieval.

As explained in the foregoing, it is rendered possible to effect the retrieval, hard copying and transmission at a higher speed according to the process shown in FIGS. 2 and 3, regardless whether the microfilm is used in the form of a rolled film or a card film represented by a microfiche film.

Now reference is made to FIG. 4 for explaining the conventional electronic file system in a more detailed manner.

FIG. 4 is a block diagram showing an example of the conventional electronic film system, composed of a document reader 22, a printer 23, a work station 24 and a memory 26, all connected to a controller 27. An index file 25 is connected to the work station 24.

The document reader 22 utilizes for example a charge-coupled device (CCD), and converts a document by raster scanning into electrical signals, which, after suitable processing such as amplification and binary encoding, are stored in the memory 26. It is also possible to store a document prepared in the work station, 24, or information entered from an unrepresented facsimile device. In this manner the necessary documents can be stored in succession in the memory 26.

The capacity of the memory 26 should naturally be as large as possible. As an example, an optical disk memory of a diameter of 30 cm can store non-code information approximately corresponding to about fifty books, or a small bookcase. At the storage of a document in the memory 26, the index of said document is simultaneously stored in the index file 25.

In case of preparing a hard copy of the document stored in the memory 26, a keyword, for example, of the document is entered through the work station 24. Then reference is made to the index file 25 and the desired document is read from the memory 26 and released as a hard copy in the printer 23.

The printer 23 can be an electrostatic printer or a laser beam printer. It is also possible to monitor the information as a soft copy displayed on the work station 24 instead of the hard copy.

The controller 27 controls the entire system, and includes an interface and, if necessary, a band compressing and expanding circuit. The controller 27 may be constructed separately as shown in FIG. 4 or integrated with the document reader 22, printer 23, work station 24 or memory 26.

As explained in the foregoing, the electronic file system can achieve automatic retrieval within several seconds, since a large amount of documents is stored through the document reader 22 into the memory 26 in the form of electrical signals. Also it has a strong advantage of allowing retrieval of the document even immediately after the storage thereof, since the development process as in the conventional microfilm is no longer necessary.

On the other hand, certain advantages of the conventional microfilm system are lost. For example the input speed is lower because of the raster scanning required at the photoelectric conversion, as one-shot conversion through a lens system as in the microfilm system is not feasible. There are still other disadvantages such as inability to prepare records less than several hundred frames in high-speed and economical manner, absence of actual archival storage, in contrast to the possible archival storage for over 100 capable with microfilms, and absence of authorization as legal evidence which is already acknowledged for microfilms.

An even greater difficulty is that the data base and information conventionally built up with the microfilm system become no longer useful at the introduction of the electronic file system. The microfilm system and the electronic file system have respective advantages as explained before, and the microfilm system cannot be disregarded though the electronic file system has many advantages in consideration of the recent trend of office automation. Consequently users are either compelled to select either of these two systems or have to endure the inconvenience of using two systems in parallel manner.

DISCLOSURE OF INVENTION

An object of the present invention is to provide an image file system not associated with the foregoing drawbacks.

Another object of the present invention is to provide a file system capable of reading image data from an unerasable image file or from a rewritable image file.

Still another object of the present invention is to provide a file system in which a microfilm system and an image disk system are united.

Still another object of the present invention is to provide a file system in which retrieving information for reading a desired image from the microfilm and retrieving information for reading a desired image from the image disk are stored in a common index file.

Still another object of the present invention is to provide a file system capable of processing large portion of non-code image information.

The foregoing and still other objects of the present invention will become fully apparent from the following description of the embodiments.

BEST MODE FOR CARRYING OUT THE INVENTION

Now the present invention will be clarified in detail by embodiments thereof shown in the attached drawings.

Figure 4:
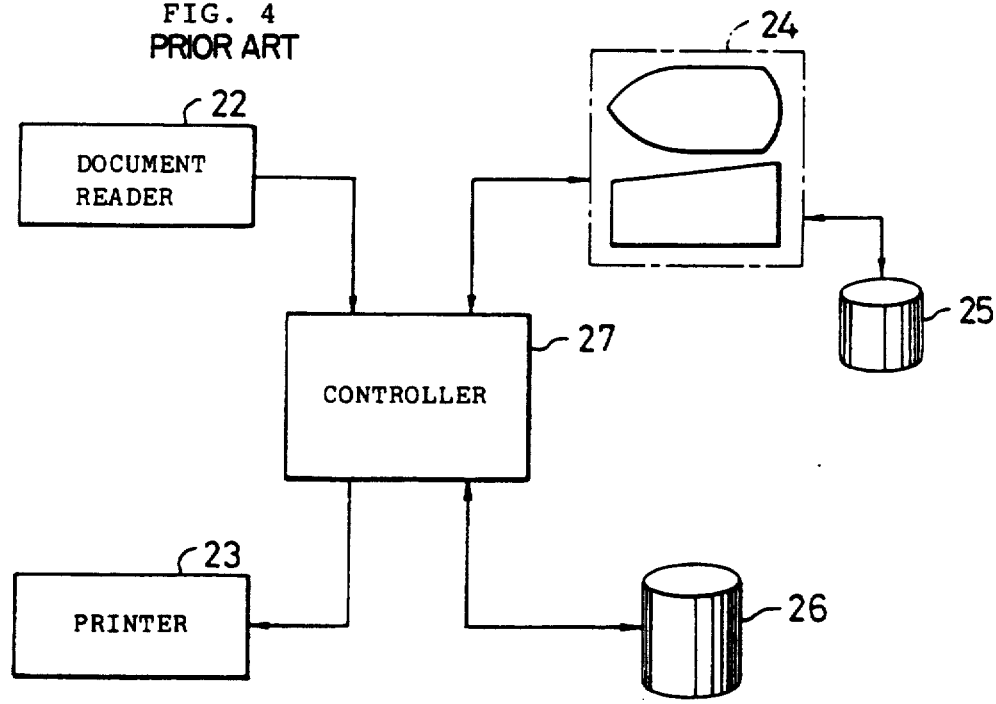
FIG. 4 is a block diagram showing the structure of a conventional electronic file system.
Figure 5:
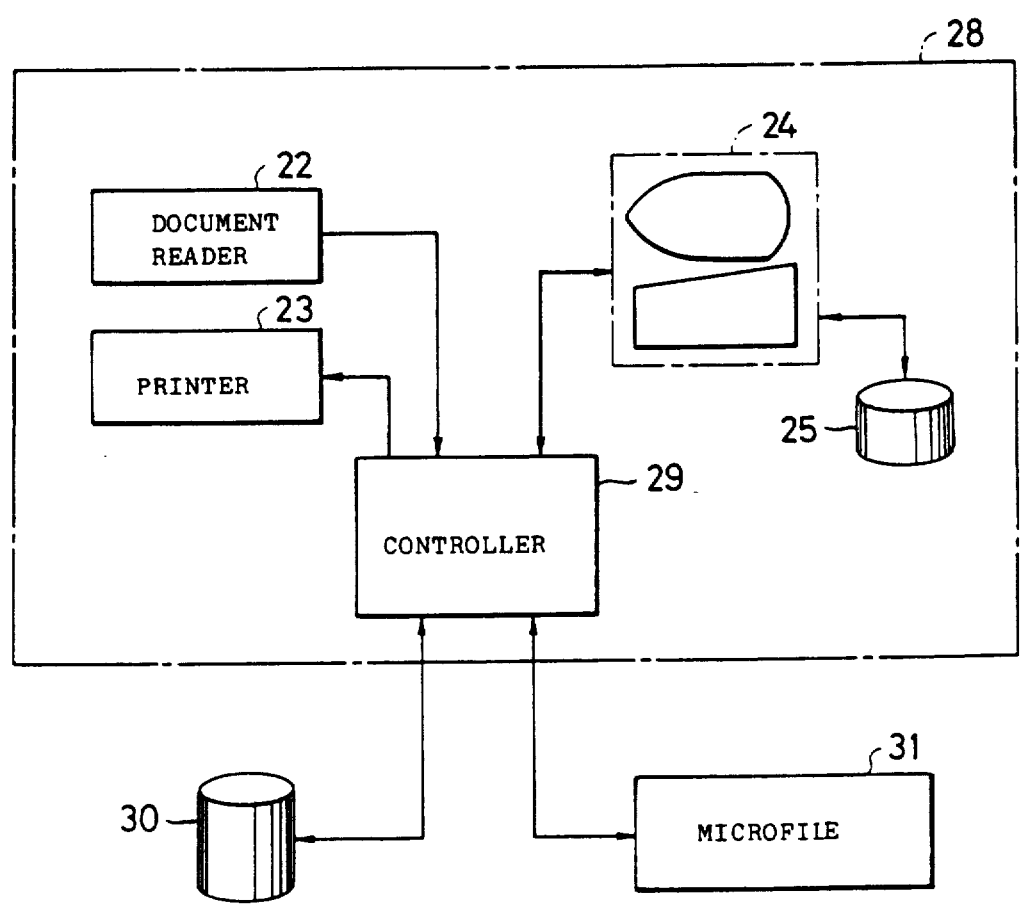
FIG. 5 is a block diagram showing an embodiment of a file system of the present invention.

FIG. 5 shows the structure of an embodiment of a united file system according to the present invention. A partial system 28 including the controller 29 corresponds in the present embodiment to the conventional electronic file system shown in FIG. 4, wherein same components are represented by same numbers, but the present invention is not limited to such embodiment. The present invention is featured by a disk memory 30 and a microfilm file 31 connected to a same controller 29 and commonly controlled. Other units such as the document reader 22, printer 23, work station 24 and index file 25 are connected in the same manner as shown in FIG. 4 and will not therefore be explained further. In the, following there will be given an explanation of the operation of the present embodiment.

A large amount of documents is read by the document reader 22 and stored in the disk memory 30, which is a random access type memory as explained before and is preferably composed of a memory of high density and high capacity such as an optical disk memory, for the purpose of space saving. The indexes of the information stored in the memory 30 are stored in the index file 25 and administered by the work station 24.

Figure 1:
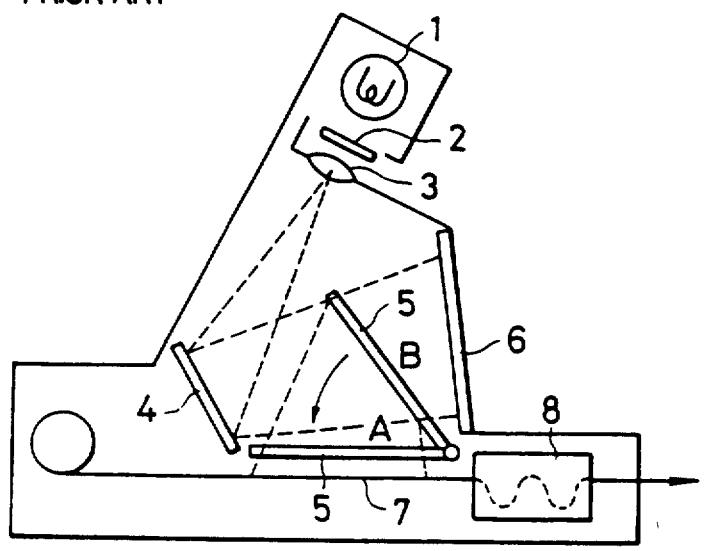
FIG. 1 is a schematic view of a microfilm reader-printer.
Figure 2:
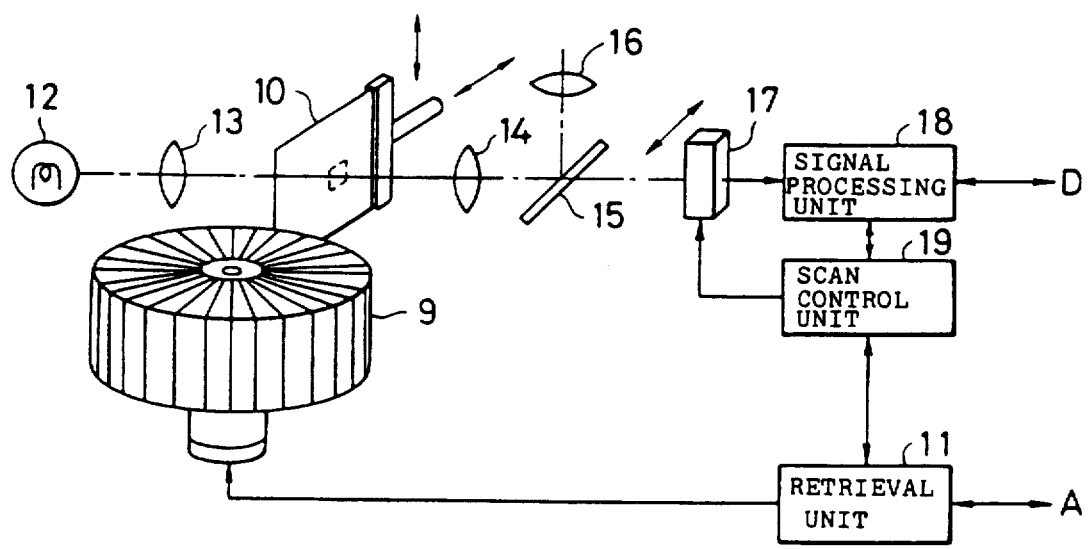
FIG. 2 is a block diagram showing the structure of a microfiche file.
Figure 3:
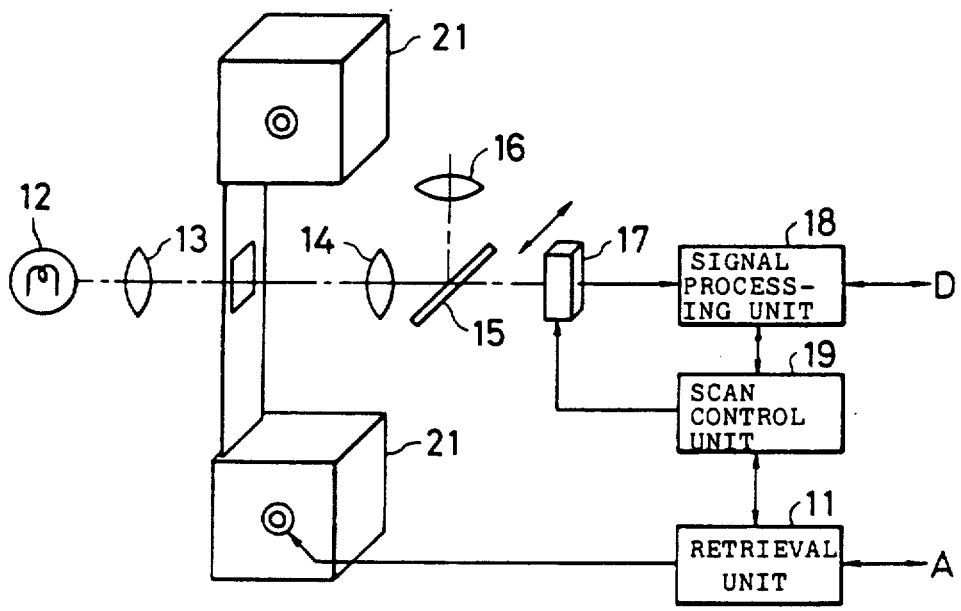
FIG. 3 is a block diagram showing the structure of a microfilm roll file.

The microfilm file 31 is preferably provided with automatic retrieval function as shown in FIGS. 2 and 3, but it can be any type as long as it is equipped with means for converting the image of microfilms into electrical signals by raster scanning. In the present embodiment there is employed, as an example, the microfilm roll file shown in FIG. 3.

The index of each frame of the microfilms stored in the microfilm file 31 is stored in the index file 25 and administered by the work station 24, in the same manner as the index of the information stored in the memory 30. The index file 25 can be composed of a magnetic disk memory, a floppy disk or a semiconductor memory incorporated in the work station 24.

When the operator enters a retrieving condition of the desired information through input means such as a keyboard of the work station 24, it compares the entered retrieving condition with the indexes stored in the index file 25 to indentify whether the desired information is stored either in the memory 30 or in the microfilm file 31, and supplies the controller 29 with the track number in case the information is in the memory 30, or the frame number if the information is in the microfilm file 31.

Then an instruction of the operator to retrieve the information is supplied, through the input means of the work station 24, to the controller 29, which, in response, supplies a read-out signal together with the address of the information either to the memory 30 or to the microfilm file, 31.

If information is stored in the memory 30, it supplies the controller 29 with the information according to the read-out instruction signal and address signal thus entered.

If other hand, in case the information is stored in the microfilm file 31, it retrieves the frame of the information according to the read-out instruction signal and frame number thus entered, then converts the two-dimensional image information into electrical signals by raster scanning and supplies the signals to the controller 29 after determined processing.

Figure 6:
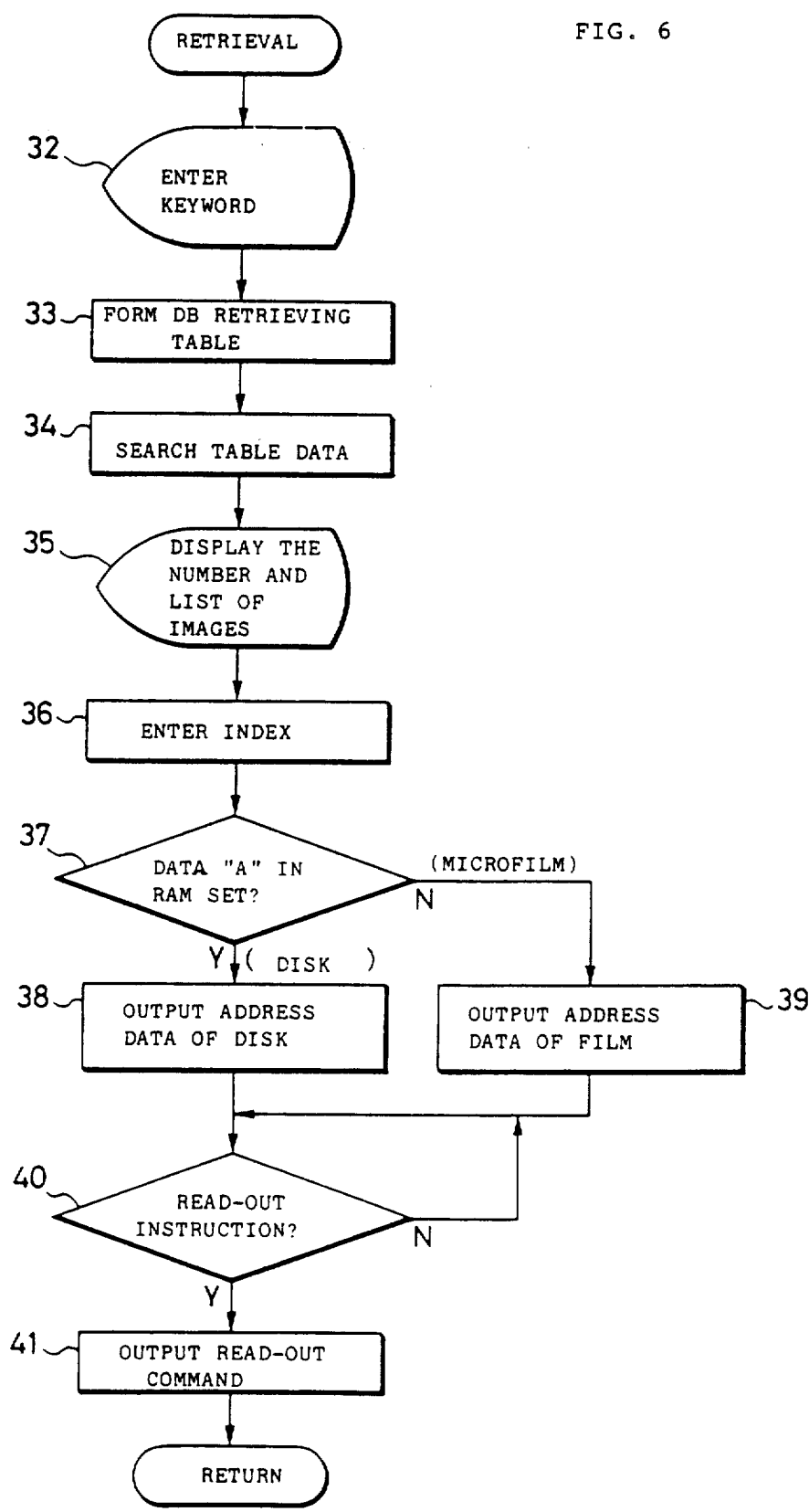
FIG. 6 is a flow chart showing the procedure of image retrieval.

FIG. 6 shows an example of a retrieving flow chart which is to be executed by a processor in the work station 24. At first a keyword is entered as the retrieving condition through the keys of the work station 24 (step 32). Then an index data base DB stored in a floppy disk 25 is developed in a memory RAM of the work station 24 to form a retrieving table (step 33).

Subsequently the table data in the RAM are searched according to the entered keyword data (step 34), whereby the number of images meeting the retrieving condition and a list of the images are obtained and displayed on the work station 24 (step 35).

Then, upon entry of a desired index through the keys (step 36), there is identified whether the image corresponding to the index is stored in the microfilm or in the disk (step 37). This operation is achieved by identifying the setting state of data A, which indicates the media of image storage and is stored together with the index data as a part of data base in the RAM. In case the data A is set, indicating that the image is stored in the disk, the address data, such as the track number in the disk, is released (step 38). On the other hand, if the image is stored in the film, the address data such as the frame number of the film is released (step 39). The step 37 also displays the media in which the image is stored. Then a discrimination is made whether an image read-out instruction is entered (step 40), and, if affirmative, command data are supplied to the controller 29 to read the image data either from the film or from the disk in which the desired image is stored.

The information supplied in this manner to the controller 29 can be processed in the same manner, regardless whether it has been stored in the memory 30 or in the microfilm file 31. The controller 29 can supply the information received from the memory 30 or from the microfilm file 31 either to the work station 24 for display as a soft copy on the display unit or to the printer 23 for output as a hard copy.

It is also possible to store, in the memory 30 through the document reader 22, the information of which amount is less than a unit volume of the microfilm file 31 which is a sheet of microfiche in case of a microfiche file or a cartridge in case of a microfilm roll file, thus enabling effective use thereof, and to transfer the information to the microfilm when the amount becomes large enough. In the conventional microfilm system the information has to be left dead until an economical unit of information is collected since the recording of information less than a microfiche sheet or a microfilm cartridge is uneconomical, but the system of the present invention always allows effective use of information by the method of use mentioned above.

Besides, the file system of the present invention is provided not only with the advantages of the microfilm system such as a high input speed, archival storage performance, ability for high-speed recording of a large amount, ability to provide a large-sized image and acceptance as legal evidence, but also the advantages of electronic file system such as a high-speed retrieval, possibility of image retrieval immediately after information input, and ease of image transmission.

Since the information in the electronic file system and that in the microfilm system can be equally handled, it is rendered possible to select the optimum form of storage according to the species of information, frequency and nature of use thereof, and also to alter the form of storage easily according to the change of circumstances.

Also in case the administration of information is shifted from a microfilm file system to a new electronic file system, the operator can retrieve all the information in a single file system, without the trouble of using two systems in parallel taking the time of system shift into consideration.

Furthermore, though the microfilm file system does not allow a change of information afterwards, the file system of the present invention enables one to add, alter or correct the information freely. For example, in case information stored in a microfilm has to be partially corrected afterwards, the information of corresponding page is read from the microfilm, subjected to necessary addition or correction and stored then in the electronic file, and the addition or correction of information can be immediately achieved in this manner.

Also, in the system shown in FIG. 5, it is possible to automatically record the information read from the microfilm file 31 into the memory 30. In this manner a huge amount of microfilmed information accumulated in the past can be converted into the information in the electronic file, for example through an unmanned operation during the night. In such case it is naturally necessary to change the retrieving information in the index file 25 accordingly.

It is furthermore possible to enter a large amount of information into microfilms which allow high-speed input of two pages every second in a microfilming laboratory, and to edit the frequently used information for example in a disk of the memory 30 through the above-mentioned automatic conversion. Such concentration of frequently used information in one place allows a significantly improvement of the retrieving speed in comparison with a case where such information are dividedly stored in various media.

We claim:

1. A file system comprising:
   first storage means for storing a plurality of retrievable image information in advance;
   second storage means for storing a plurality of retrievable image information, said second storage means being of a different storing type from said first storage means;
   input means for inputting retrieval information associated with desired image information; and
   retrieval means for retrieving image information from said first or second storage means on the basis of common retrieval information from said input means,
   wherein said retrieval means automatically selects one of said first and second storage means on the basis of the common retrieval information in order to output desired image information.

2. A file system according to claim 1, wherein said first storage means includes image storage means is incapable of being rewritten.

3. A file system according to claim 1, wherein said first storage means prestores visualized image information and said second storage means stores information associated with electronic image information.

4. A file system according to claim 3, wherein said first storage means is microfilm and said second storage means is an image disk.

5. A file system according to claim 3, wherein said first storage means includes conversion means for reading stored image information and outputting an electrical signal.

6. A file system according to claim 1, wherein said retrieval means outputs desired image information after identifying whether it is stored in said first or second storage means.

7. A file system according to claim 1, wherein said retrieval means is capable of selectively reading out desired information stored in said first storage means and/or desired information stored in said second storage means on the basis of the common retrieval information.

8. A file system according to claim 1, wherein said retrieval means includes an index file relating to image information stored in said first and second storage means and retrieves desired image information on the basis of the retrieval information input by said input means and the index file.

9. A file system according to claim 1, further comprising means for displaying image information retrieved by said retrieval means.

10. A file system according to claim 1, further comprising means for printing image information retrieved by said retrieval means.

11. A file system according to claim 1, further comprising means for storing image information in said second storage means.

12. A file system according to claim 1, wherein said retrieval means displays a list of retrieved image information when a list of a plurality of image information is retrieved on the basis of the retrieval information input by said input means.

13. A file system according to claim 12, wherein said retrieval means outputs designated image information from said first or second storage means if listed image information is designated by said input means.

14. A file system comprising:
   first storage means for storing a plurality of image information;
   second storage means for storing image information, said second storage means being different from said first storage means and being rewritable;
   input means for inputting retrieval information associated with desired image information;
   retrieval means for retrieving image information from said first or second storage means on the basis of the retrieval information from said input means;
   wherein said retrieval means automatically selects one of said first and second storage means on the basis of common retrieval information in order to output desired image information; and
   control means for storing the image information in said second storage means when image information is retrieved from said first storage means by said retrieval means.

15. A file system according to claim 14, wherein said first storage means prestores visualized image information and said second storage means stores information associated with electronic image information.

16. A file system according to claim 15, wherein said first storage means is microfilm and said second storage means is an image disk.

17. A file system according to claim 15, wherein said first storage means includes conversion means for reading stored image information and outputting an electrical signal.

* * * * *

UNITED STATES PATENT AND TRADEMARK OFFICE
CERTIFICATE OF CORRECTION

PATENT NO. : 4,996,664

DATED : February 26, 1991

INVENTOR(S) : Fujiwara et al.

It is certified that error appears in the above identified patent and that said Letters Patent is hereby corrected as shown below:

On title page item [56]: FOREIGN PATENT DOCUMENTS

Line 1, insert --47-78474 5/1972 Japan.

COLUMN 1

Line 28, "networks" should read --networks,--.

COLUMN 2

Line 36, "processsing" should read --processing--.

COLUMN 3

Line 7, "tion, 24," should read --tion 24,--; and

Line 54, "100 capable" should read --100 years capable--.

COLUMN 4

Line 56, "the," should read --the--.

UNITED STATES PATENT AND TRADEMARK OFFICE
CERTIFICATE OF CORRECTION

PATENT NO. : 4,996,664

DATED : February 26, 1991

INVENTOR(S) : Fujiwara et al.

It is certified that error appears in the above-identified patent and that said Letters Patent is hereby corrected as shown below:

COLUMN 5

Line 16, "indentify" should read --identify;

Line 28, "information" should read --the information--; and

Line 32, "If other hand, in case" should read --On the other hand, if--.

COLUMN 7

Line 2, "significantly" should read --significant--.

Signed and Sealed this

Twenty-second Day of December, 1992

*Attest:*

DOUGLAS B. COMER

*Attesting Officer*  *Acting Commissioner of Patents and Trademarks*